United States Patent [19]

Liaw et al.

[11] Patent Number: 4,457,629
[45] Date of Patent: Jul. 3, 1984

[54] GLUTEN MAKER FOR THE HOME

[76] Inventors: Soonchin Liaw; George Spector, both of 3615 Woolworth Bldg., 233 Broadway, New York, N.Y. 10007

[21] Appl. No.: 526,784

[22] Filed: Aug. 26, 1983

[51] Int. Cl.³ .............................................. B01F 13/06
[52] U.S. Cl. .................................... 366/139; 366/143; 366/191; 366/286
[58] Field of Search .......................... 99/472; 209/643; 366/75, 77, 96, 97, 98, 139, 143, 191, 247, 251, 279, 285, 286, 314, 331, 347, 349

[56] References Cited

U.S. PATENT DOCUMENTS 3,355,153  11/1967  Nolte, Jr. ............................ 366/286
3,640,510  2/1972   Lea ..................................... 366/139
4,410,280  10/1983  Yamauchi ............................ 366/314

Primary Examiner—Philip R. Coe
Assistant Examiner—Arthur D. Dahlberg

[57] ABSTRACT

Apparatus for making gluten flour using an electric dough maker is provided and consists of a mixer container having rotatable blades and a shaft through a bottom portion, so that the blades can agitate the flour, the mixer container removably affixed to and operated by the dough maker, a first lid placed on the mixer container, means for sucking up starch particles when the flour is agitated, a flexible outlet pipe having one end affixed to the first lid to allow for exit of the starch particles, a second lid affixed to other end of the flexible outlet pipe and a container having the second lid placed on it to trap the starch particles while leaving the gluten flour in the mixer container to be prepared as dough.

5 Claims, 3 Drawing Figures

GLUTEN MAKER FOR THE HOME

BACKGROUND OF THE INVENTION

The instant invention relates generally to gluten flour and more specifically it relates to an apparatus for making gluten flour using an electric dough maker.

Gluten is a gray, sticky, nutritious substance found in wheat flour, which gives dough its tough, elastic quality. Gluten bread which is a yeast bread is made from flour rich in gluten and low in starch.

SUMMARY OF THE INVENTION

A principle object of the present invention is to provide an apparatus for making gluten flour using an electric dough maker that can separate the starch from the flour.

Another object is to provide an apparatus for making gluten flour using an electric dough maker that can trap the starch after it is separated from the flour.

An additional object is to provide an apparatus for making gluten flour using an electric dough maker that has an adjustable mixer container for different amount of flour placed into it.

A further object is to provide an apparatus for making gluten flour using an electric dough maker that is simple and easy to use.

A still further object is to provide an apparatus for making gluten flour using an electric dough maker that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
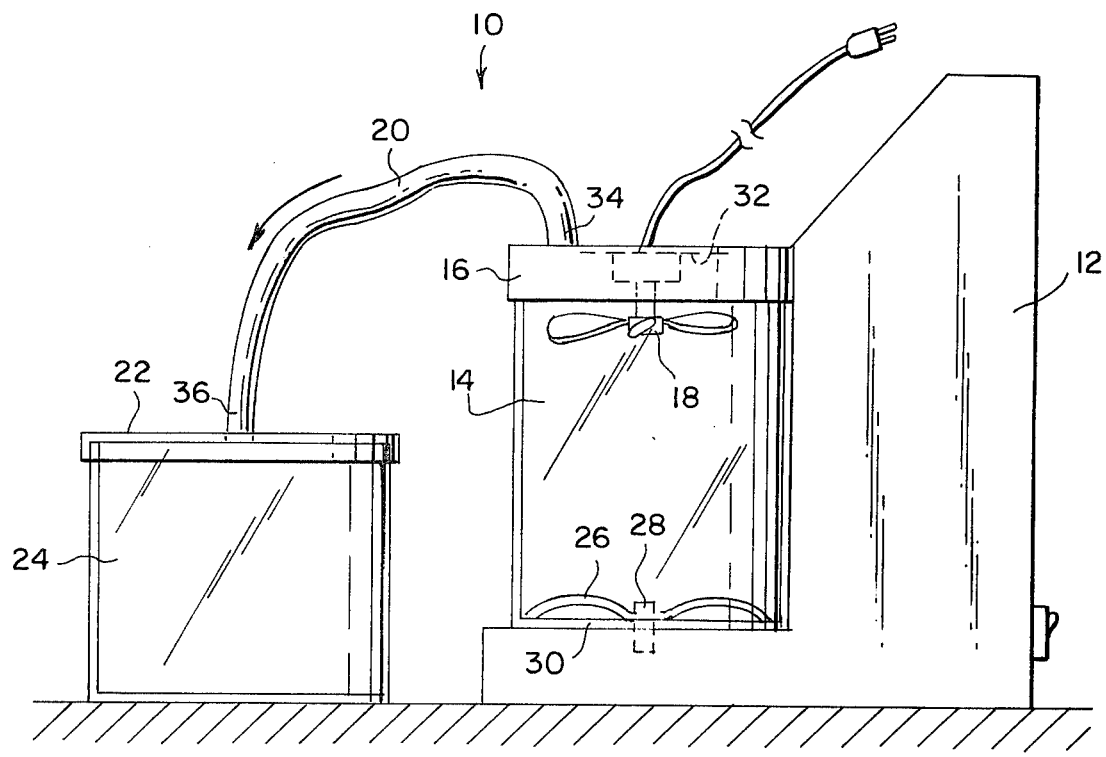
FIG. 1 is a side view of the invention.

Turning now descriptively to the drawings, in which similar reference characters denote similar elements throughout the several views, FIG. 1 illustrates an apparatus 10 for making gluten flour using an electric dough maker 12. The apparatus 10 basically consists of a mixer container 14, a first lid 16, a high speed electric fan 18, a flexible outlet pipe 20, a second lid 22 and a container 24.

The mixer container 14 has rotatable blades 26 and a shaft 28 through a bottom portion 30 so that the blades 26 can agitate the flour. The mixer container 14 is removably affixed to and operated by the dough maker 12. The first lid 16 is placed on the mixer container 14 while the high speed electric fan 18 is affixed to inner side 32 of the first lid 16 for sucking up starch particles when the flour is agitated. The flexible outlet pipe 20 has one end 34 affixed to the first lid 16 to allow for exit of the starch particles. The second lid 22 is affixed to other end 36 of the flexible outlet pipe 20. The container 24 has the second lid 22 placed on it to trap the starch particles while leaving the gluten flour in the mixer container 14 to be prepared as dough.

The mixer container 14 is made of a transparent material so that a person may view the agitation of the flour and the sucking up of the starch particles within the mixer container 14. The container 24 is made of a transparent material so that a person may view the trapping of the starch particles within the container 24.

Figure 2:
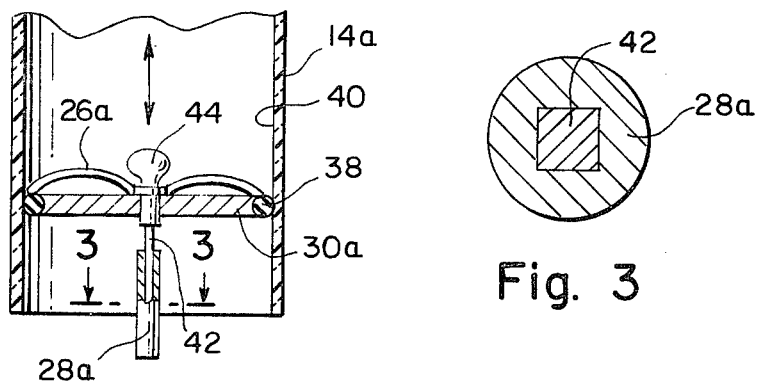
FIG. 2 is a partial cross sectional view of a modification of the invention showing an adjustable mixer container.
Figure 3:
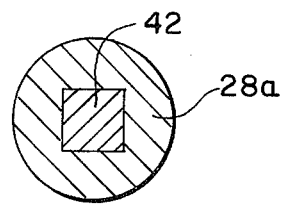
FIG. 3 is a cross sectional view taken along line 3—3 in FIG. 2.

FIGS. 2 and 3 shows a modified mixer container 14a. The bottom portion is a separate movable member 30a having an "O" ring 38 around its perimeter to engage inner wall 40 of the mixer container 14a. The shaft 28a is telescoping at 42 and has a pull knob 44 on top so that the blades 26a and the bottom portion 30a can move up and down to adjust to different amounts of the flour placed into the mixer container 14a. In FIG. 3 the telescoping shaft 42 is shown as a square shape so that it can slide up and down within shaft 28a and also rotate with the shaft 28a.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. Apparatus for making gluten flour using an electric dough maker which comprises:
   (a) a mixer container having rotatable blades and a shaft through a bottom portion, so that the blades can agitate the flour, the mixer container removably affixed to and operated by the dough maker;
   (b) a first lid placed on the mixer container;
   (c) means for sucking up starch particles when the flour is agitated;
   (d) a flexible outlet pipe having one end affixed to the first lid to allow for exit of the starch particles;
   (e) a second lid affixed to other end of the flexible outlet pipe; and
   (f) a container having the second lid placed on it to trap the starch particles while leaving the gluten flour in the mixer container to be prepared as dough.

2. Apparatus for making gluten flour as recited in claim 1, wherein the means for sucking up starch particles when the flour is agitated is a high speed electric fan affixed to inner side of the first lid.

3. Apparatus for making gluten flour as recited in claim 2, wherein the mixer container is made of a transparent material so that a person may view the agitation of the flour and the sucking up of the starch particles within the mixer container.

4. Apparatus for making gluten flour as recited in claim 3, wherein the container is made of a transparent material so that a person may view the trapping of the starch particles within the container.

5. Apparatus for making flour as recited in claim 4, wherein the mixer container further contains:
   (a) the bottom portion being a separate movable member having an "O" ring around its perimeter to engage inner wall of the mixer container; and
   (b) the shaft being telescoping and having a pull knob on top so that the blades and the bottom portion can move up and down to adjust to different amounts of the flour placed into the mixer container.

* * * * *